J. B. Dougherty,
Making-Hoops.
Nº 41,688. Patented Feb. 23, 1864.
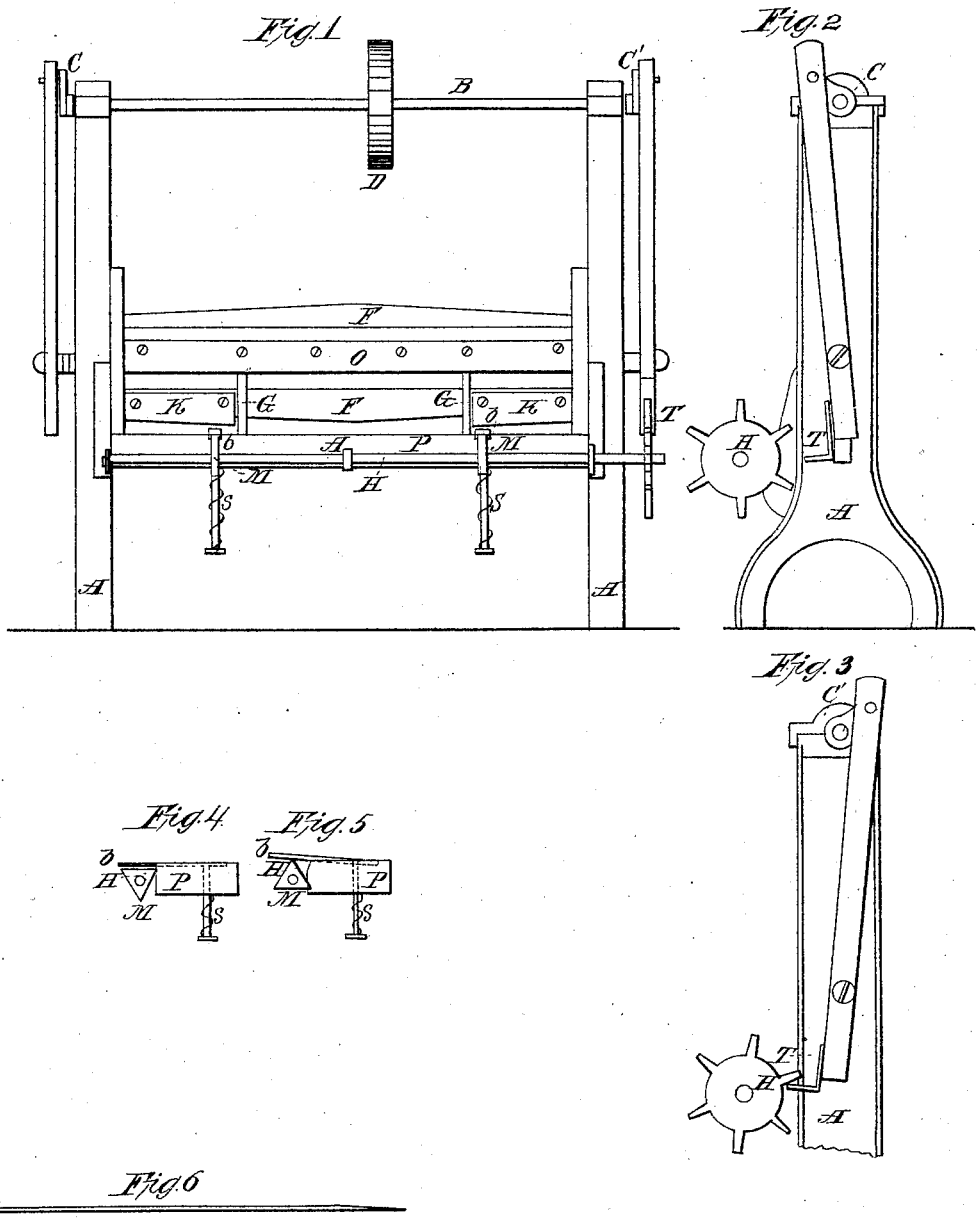
Witnesses
John Pline
Wm H Allen
Inventor
John B Dougherty

UNITED STATES PATENT OFFICE.

JOHN B. DOUGHERTY, OF ROCHESTER, NEW YORK.

IMPROVEMENT IN MACHINES FOR MAKING SPLINTS FOR BARREL-HOOPS.

Specification forming part of Letters Patent No. 41,688, dated February 23, 1864.

*To all whom it may concern:*

Be it known that I, JOHN B. DOUGHERTY, of the city of Rochester, county of Monroe, and State of New York, have made and invented a certain new and useful machine for cutting splints for barrel-hoops, for cheese-boxes, for strawberry-boxes, and for similar purposes; and I do hereby declare the following to be a full and accurate description of the same, reference being had to the accompanying drawings, making part of this specification, and to the letters of reference marked thereon, same letters referring to like parts in all the figures.

Of said drawings, Figure 1 is a front elevation of my improved machine. Fig. 2 is an end view of the same, and Figs. 3, 4, 5, and 6 are figures of details.

The nature of this invention consists in so combining and arranging the several parts of a machine that a splint may be thereby cut from the edge of a board where the thickness is equal to the width of the desired splint, said splint at the same operation, and during the process of cutting, being shaved or tapered so as to present an edge view, as shown in Fig. 6, by which means when the hoop or box is formed it shall not be thicker at the point where the ends of the splint lap than in any other part; and in the case of splints for hoops, cutting them thicker at one edge than at the other, so that the hoop may conform to the conical shape of the barrel. The construction of the machine by which I attain these ends is as follows:

A A A, Fig. 1, is a stout cast-iron frame, across the top of which is placed the shaft B, carrying the drum or pulley D, by which the machine is driven, and the two cranks C C', which give a vertical reciprocating motion to the knife-frame E F, as shown in Figs. 1 and 2. In order to cut a hoop-splint from a board it is necessary merely to lay the board on the platform of the frame, when the descent of the knife will accomplish the object aimed at; but in order to shave or taper the ends of the splint I arrange two other knives, K K, at the ends of the knife-frame F, which knives, coming down before the long knife O, cut off so much from the ends as is desired to produce the required taper.

In order that the board may be properly presented to the knives, the frame F carries two guides, G G, which at the lower end allow the board to be advanced just so much as is desired to cut off the required taper and at the upper end regulate the distance of the edge of the board from the knife O, as may be required for the thickness of hoop desired. This is all that is required to produce splints of equal thickness on both edges; but when it is desired to give greater thickness to one edge than to the other, I make use of the following device:

Into the platform P, Fig. 4, of the frame A, I let two or more bars, *b b*, which are kept down and level with the surface of said platform by means of the springs *s s*. These bars may, however, be raised so as to tilt the board from which the splints are to be cut. This is effected three times during the revolution of the shaft H by means of the triangular cams M—viz., when their points or angles are vertically over the center of said shaft. When the flat sides of these cams are uppermost, the bars *b b* lie level with the surface of the platform P. Hence if the shaft be moved through one-sixth of a revolution, at each revolution of the cranks C C the splints will be cut alternately with a thin and a thick edge uppermost, and the stuff will be cut up into splints without any loss. This is accomplished as follows: The connecting rod or pitman which carries the knife-frame has attached to it a toe, T, while the shaft, which carries the triangular cams, carries a wheel with six radial teeth, as shown in Fig. 2. When the connecting-rod and toe are descending, they occupy the position shown in Fig. 2, and the toe passes clear of the wheel; but when the connecting-rod ascends it assumes the position shown in Fig. 3, when the toe catches a tooth of the wheel and rotates the shaft through one sixth of a revolution.

It is obvious that other arrangements of the parts of this machine will accomplish substantially the same end. Thus an alternating motion might be given to the board from which the splints are cut so that the ends may be alternately presented to the knife so as to be shaved, after which the board may be presented squarely to the machine so as to cut off the splint; but for simplicity and effectiveness I much prefer the form exhibited in the present drawings and herein described.

Having thus described my invention, what I claim as new, and desire to secure by Letters Patent, is—

The within-described machine for preparing at one operation hoop-splints ready for market, said machine being constructed and operating substantially as set forth.

JOHN B. DOUGHERTY.

Witnesses:
JOHN PHIN,
WM. H. ALLEN.